United States Patent
Chen et al.

(10) Patent No.: US 11,831,554 B2
(45) Date of Patent: Nov. 28, 2023

(54) PACKET FORWARDING METHOD AND APPARATUS, SYSTEM, DEVICE, AND STORAGE MEDIUM

(71) Applicant: HUAWEI TECHNOLOGIES CO., LTD., Shenzhen (CN)

(72) Inventors: Lihao Chen, Beijing (CN); Tongtong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/698,049

(22) Filed: Mar. 18, 2022

(65) Prior Publication Data

US 2022/0210083 A1 Jun. 30, 2022

Related U.S. Application Data

(63) Continuation of application No. PCT/CN2020/093628, filed on May 30, 2020.

(30) Foreign Application Priority Data

Sep. 20, 2019 (CN) .......................... 201910893509.6

(51) Int. Cl.
*G06Q 40/04* (2012.01)
*H04L 67/104* (2022.01)
(Continued)

(52) U.S. Cl.
CPC ...... *H04L 47/2441* (2013.01); *H04L 47/2416* (2013.01); *H04L 47/62* (2013.01); *H04L 67/06* (2013.01)

(58) Field of Classification Search
CPC ................................ H04L 47/24; H04L 47/62
See application file for complete search history.

(56) References Cited

U.S. PATENT DOCUMENTS

| 6,052,375 | A | 4/2000 | Bass et al. |
| 7,203,169 | B1 * | 4/2007 | Okholm ............. H04L 41/0816 370/252 |

(Continued)

FOREIGN PATENT DOCUMENTS

| CN | 1499775 A | 5/2004 |
| CN | 1913486 A | 2/2007 |

(Continued)

OTHER PUBLICATIONS

Mohammadpour. Literature Latency and Backlog Bounds in Time-Sensitive Networking with Credit Based Shapers and Asynchronous Traffic Shaping. Apr. 2018. Ecole Polytechnique F'ed'erale de Lausanne, Switzerland/ (Year: 2018).*

(Continued)

*Primary Examiner* — Bryan Y Lee
(74) *Attorney, Agent, or Firm* — Leydig, Voit & Mayer, Ltd.

(57) ABSTRACT

This application discloses a packet forwarding method and apparatus, a system, a device, and a storage medium. The method is applied to an in-vehicle network and includes: obtaining, by a network device, a plurality of packets carried on an Ethernet link in the in-vehicle network, where the plurality of packets are packets of one or more application categories; determining a traffic class of each packet based on an application category of each packet in the plurality of packets; adding each packet to a forwarding queue corresponding to the traffic class based on the traffic class of each packet; and scheduling and forwarding packets in all forwarding queues based on an absolute priority and a traffic class corresponding to each forwarding queue, and using a shaper in a forwarding queue of at least one traffic class in intermediate traffic classes in the scheduling and forwarding process.

18 Claims, 6 Drawing Sheets

(51) Int. Cl.
*H04L 47/2441* (2022.01)
*H04L 47/2416* (2022.01)
*H04L 47/62* (2022.01)
*H04L 67/06* (2022.01)

(56) References Cited

U.S. PATENT DOCUMENTS

| | | | |
|---|---|---|---|
| 9,736,791 | B1 | 8/2017 | Ameixieira |
| 2005/0249117 | A1 | 11/2005 | Gerkins |
| 2009/0196176 | A1* | 8/2009 | Nishimura ............ H04L 47/215 370/230.1 |
| 2014/0036672 | A1 | 2/2014 | Kulkarni et al. |
| 2016/0345233 | A1 | 11/2016 | Bao et al. |
| 2018/0025299 | A1* | 1/2018 | Kumar ................ G06F 12/1408 709/224 |
| 2019/0166062 | A1 | 5/2019 | Verbree et al. |
| 2019/0199641 | A1 | 6/2019 | Lo Bello et al. |
| 2020/0382444 | A1* | 12/2020 | Yousefi ................ B60R 16/023 |
| 2021/0135996 | A1* | 5/2021 | Back ....................... H04L 47/54 |

FOREIGN PATENT DOCUMENTS

| | | |
|---|---|---|
| CN | 107070808 A | 8/2017 |
| CN | 107634917 A | 1/2018 |
| CN | 108282502 A | 7/2018 |
| CN | 109921972 A | 6/2019 |
| CN | 109962863 A | 7/2019 |
| CN | 110048922 A | 7/2019 |
| JP | 2018121120 A | 8/2018 |
| JP | 2019054350 A | 4/2019 |
| JP | 2019153887 A | 9/2019 |

OTHER PUBLICATIONS

"IEEE Standard for Information technology—Telecommunications and information exchange between systems Local and metropolitan area networks—Specific requirements, Part 11: Wireless LAN Medium Access Control(MAC) and Physical Layer (PHY) Specifications," IEEE Std 802.11™-2016 (Revision of IEEE Std 802.11-2012), total 3534 pages, IEEE Computer Society (2016).

"IEEE Standard for Local and Metropolitan Area Networks—Bridges and Bridged Networks," IEEE Std 802.1Q™-2018 (Revision of IEEE Std 802.1Q-2014), total 1993 pages, IEEE Computer Society (2018).

"IEEE Standard for Local and metropolitan area networks—Virtual Bridged Local Area Networks, Amendment 12: Forwarding and Queuing Enhancements for Time-Sensitive Streams," IEEE Std 802.1Qav™-2009, total 87 pages, IEEE Computer Society, Sponsored by the LAN/MAN Standards Committee (2009).

Babiarz et al., "Configuration Guidelines for Basic Classes of Managed Traffic," Internet draft, draft-baker-diffserv-basic-classes-00.txt, Total 33 pages (Jun. 2003).

"Draft Standard for Local and Metropolitan Area Networks-Bridges and Bridged Networks-Amendment: Asynchronous Traffic Shaping," IEEE P802.1Qcr/D0.5, Total 113 pages, Institute of Electrical and Electronics Engineers, New York, New York (Jun. 12, 2018).

\* cited by examiner

PACKET FORWARDING METHOD AND APPARATUS, SYSTEM, DEVICE, AND STORAGE MEDIUM

CROSS-REFERENCE TO RELATED APPLICATIONS

This application is a continuation of International Application No. PCT/CN2020/093628, filed on May 30, 2020, which claims priority to Chinese Patent Application No. 201910893509.6, filed on Sep. 20, 2019. The disclosures of the aforementioned applications are hereby incorporated by reference in their entireties.

TECHNICAL FIELD

This application relates to the field of in-vehicle network technologies, and in particular, to a packet forwarding method and apparatus, a system, a device, and a storage medium.

BACKGROUND

Because development of automotive technologies such as an advanced driver-assistance system (ADAS), in-vehicle infotainment (IVI), and remote download/upgrade/update (for example, over the air (OTA)) raises a higher bandwidth requirement for in-vehicle networks, Ethernet-based development of in-vehicle networks gradually becomes a trend. In the Ethernet-based process of in-vehicle networks, how to forward a packet to meet a transmission requirement has become a problem of great concern in in-vehicle network technologies.

SUMMARY

Embodiments of this application provide a packet forwarding method and apparatus, a system, a device, and a storage medium, so as to resolve a problem in a related technology. Technical solutions are as follows:

According to one aspect, a packet forwarding method is provided. The method is applied to an in-vehicle network and includes: A network device obtains a plurality of packets carried on an Ethernet link in the in-vehicle network, where the plurality of packets are packets of one or more application categories; determines a traffic class of each packet in the plurality of packets based on an application category of each packet in the plurality of packets; adds each packet in the plurality of packets to a forwarding queue corresponding to the traffic class based on the traffic class of each packet in the plurality of packets; and schedules and forwards packets in all forwarding queues based on an absolute priority and a traffic class corresponding to each forwarding queue, and uses a shaper in a forwarding queue of at least one traffic class in intermediate traffic classes in the scheduling and forwarding process.

For a packet of one or more application categories carried on the Ethernet link, the traffic class of each packet is determined based on the application category of each packet, and after each packet is added to the forwarding queue corresponding to the traffic class based on the traffic class of each packet, the packet in each forwarding queue is scheduled and forwarded based on the traffic class corresponding to each forwarding queue, thereby meeting a transmission requirement of each packet, so that the scheduling and forwarding have better performance. Therefore, the method is applicable to an Ethernet-based in-vehicle network architecture. In addition, by using the shaper in a forwarding queue corresponding to an intermediate traffic class, a bounded latency may be further ensured.

In an example embodiment, the scheduling and forwarding packets in all forwarding queues based on an absolute priority and a traffic class corresponding to each forwarding queue, and using a shaper in a forwarding queue of at least one traffic class in intermediate traffic classes in the scheduling and forwarding process includes: in a process of the scheduling and forwarding packets in all forwarding queues based on an absolute priority and a traffic class corresponding to each forwarding queue, for any packet in the plurality of packets, determining whether there is another packet that has a higher traffic class than the any packet and that has not been scheduled and forwarded; if there is no other packet that has a higher traffic class than the any packet and that has not been scheduled and forwarded, determining whether the shaper is used in the forwarding queue in which the any packet is located; or if the shaper is used in the forwarding queue in which the any packet is located, and the shaper meets a requirement, forwarding the any packet.

In an example embodiment, for any packet in the plurality of packets, if it is determined that there is another packet that has a higher traffic class than the any packet and that has not been scheduled and forwarded, the any packet is not scheduled and forwarded temporarily.

In an example embodiment, for any packet in the plurality of packets, if it is determined that there is no other packet that has a higher traffic class than the any packet and that has not been scheduled and forwarded, and that the shaper is not used in the forwarding queue in which the any packet is located, the any packet is forwarded.

In an example embodiment, for any packet in the plurality of packets, if it is determined that there is no other packet that has a higher traffic class than the any packet and that has not been scheduled and forwarded, and that the shaper is used in the forwarding queue in which the any packet is located and the shaper does not meet the requirement, the any packet is not scheduled and forwarded temporarily.

In an example embodiment, the determining a traffic class of each packet based on an application category of each packet in the plurality of packets includes: querying a mapping table between an application category and a traffic class based on the application category of each packet in the plurality of packets, to obtain the traffic class of each packet in the plurality of packets. Forwarding efficiency may be improved by querying a traffic class based on the mapping table.

In an example embodiment, the one or more application categories are one or more of a control category, an advanced driver-assistance system (ADAS) category, an in-vehicle infotainment category, and a remote download/upgrade/update (for example, over the air, OTA) category. A traffic class of a packet of the control category is the first class, a traffic class of a packet of the ADAS category is the second class, a traffic class of a packet of the in-vehicle infotainment category is the third class, and a traffic class of a packet of the OTA category is the fourth class. A priority of the first class is higher than that of the second class, a priority of the second class is higher than that of the third class, and a priority of the third class is higher than that of the fourth class.

In an example embodiment, the shaper is used in a forwarding queue corresponding to at least one of the second class or the third class.

In an example embodiment, the shaper includes at least one of a credit-based shaping shaper and an asynchronous traffic shaper.

In an example embodiment, the packet of the control category includes at least one packet of a control instruction, sensor data, and alarm data; the packet of the ADAS category includes at least one packet of data of a detecting device and fusion data; the packet of the in-vehicle infotainment category includes at least one packet of map data, audio data, and video data; and the packet of the OTA category includes at least one packet of offline download data, firmware or software update data, and a log.

A packet forwarding apparatus is provided, where the apparatus is applied to a network device in an in-vehicle network, and the apparatus includes:

an obtaining module, configured to obtain a plurality of packets carried on an Ethernet link in the in-vehicle network, where the plurality of packets are packets of one or more application categories;

a determining module, configured to determine a traffic class of each packet in the plurality of packets based on an application category of each packet in the plurality of packets;

an enqueuing module, configured to add each packet in the plurality of packets to a forwarding queue corresponding to the traffic class based on the traffic class of each packet in the plurality of packets; and a forwarding module, configured to: schedule and forward packets in all forwarding queues based on an absolute priority and a traffic class corresponding to each forwarding queue, and use a shaper in a forwarding queue of at least one traffic class in intermediate traffic classes in the scheduling and forwarding process.

In an example embodiment, the forwarding module is configured to: in a process of the scheduling and forwarding packets in all forwarding queues based on an absolute priority and a traffic class corresponding to each forwarding queue, for any packet in the plurality of packets, determine whether there is another packet that has a higher traffic class than the any packet and that has not been scheduled and forwarded; if there is no other packet that has a higher traffic class than the any packet and that has not been scheduled and forwarded, determine whether the shaper is used in the forwarding queue in which the any packet is located; or if the shaper is used in the forwarding queue in which the any packet is located, and the shaper meets a requirement, forward the any packet.

In an example embodiment, the determining module is configured to: based on the application category of each packet in the plurality of packets, query a mapping table between an application category and a traffic class to obtain the traffic class of each packet in the plurality of packets.

In an example embodiment, the one or more application categories are a control category, an advanced driver-assistance system (ADAS) category, an in-vehicle infotainment category, and a remote download/upgrade/update (for example, over the air, OTA) category; and a traffic class of a packet of the control category is the first class, a traffic class of a packet of the ADAS category is the second class, a traffic class of a packet of the in-vehicle infotainment category is the third class, and a traffic class of a packet of the OTA category is the fourth class, where a priority of the first class is higher than that of the second class, a priority of the second class is higher than that of the third class, and a priority of the third class is higher than that of the fourth class.

In an example embodiment, the shaper is additionally used in a forwarding queue corresponding to at least one of the second class or the third class.

In an example embodiment, the shaper includes at least one of a credit-based shaping shaper and an asynchronous traffic shaper.

In an example embodiment, the packet of the control category includes at least one packet of a control instruction, sensor data, and alarm data; the packet of the ADAS category includes at least one packet of data of a detecting device and fusion data; the packet of the in-vehicle infotainment category includes at least one packet of map data, audio data, and video data; and the packet of the OTA category includes at least one packet of offline download data, firmware or software update data, and a log.

An in-vehicle control system is further provided, where the in-vehicle control system includes one or more centralized controllers, one or more domain controllers, one or more electronic control units (ECUs), and one or more Ethernet bridge devices; each centralized controller communicates with one or more of another centralized controller, the domain controller, and the ECU by using the one or more Ethernet bridge devices; each domain controller communicates with one or more of the ECU, another domain controller, and the centralized controller by using the one or more Ethernet bridge devices; at least one of the centralized controller, the domain controller, the ECU, and the Ethernet bridge device includes a packet forwarding apparatus, and the packet forwarding apparatus is configured to perform any one of the foregoing packet forwarding methods.

In an example embodiment, one or more of the domain controller, the centralized controller, and the ECU have an Ethernet bridge function.

In an example embodiment, one or more of the domain controller, the centralized controller, and the ECU have a gateway function.

In an example embodiment, the Ethernet bridge device is a centralized controller with an Ethernet bridge function, or the Ethernet bridge device is a domain controller with an Ethernet bridge function, or the Ethernet bridge device is an ECU with an Ethernet bridge function.

A packet forwarding device is further provided. The device includes a memory and a processor. The memory stores at least one instruction, and the processor loads and executes the at least one instruction to implement any one of the foregoing packet forwarding methods.

A computer-readable storage medium is further provided. The storage medium stores at least one instruction, and a processor loads and executes the instruction to implement any one of the foregoing packet forwarding methods.

Another communication apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive and send a signal. In addition, when the processor executes the instructions stored in the memory, the processor is enabled to perform the method in any one of the foregoing possible implementations.

In an example embodiment, there are one or more processors, and there are one or more memories.

In an example embodiment, the memory may be integrated with the processor, or the memory and the processor are disposed separately.

In a specific implementation process, the memory may be a non-transitory memory, such as a read-only memory (read only memory, ROM). The memory and the processor may be integrated into one chip, or may be disposed in different chips. A type of the memory and a manner in which the memory and the processor are disposed are not limited in this embodiment of this application.

A computer program (product) is provided. The computer program (product) includes computer program code. When the computer program code is run on a computer, the computer is enabled to perform the methods in the foregoing aspects.

A chip is provided. The chip includes a processor, configured to invoke and run instructions stored in a memory, so that a communication device on which the chip is installed performs the methods in the foregoing aspects.

Another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

DESCRIPTION OF EMBODIMENTS

Figure 1:
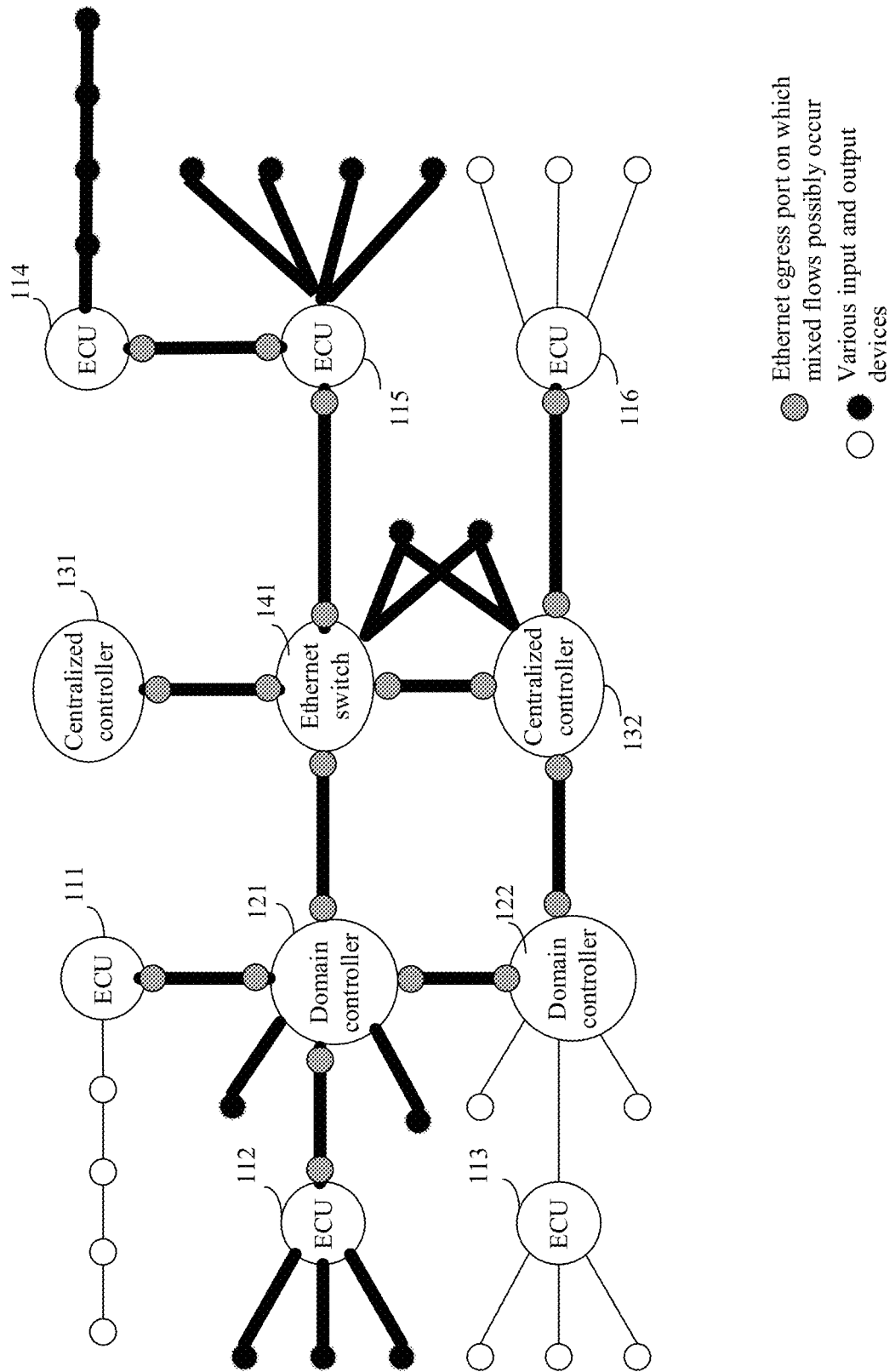
FIG. 1 is a schematic diagram of a communication system of an in-vehicle network according to an embodiment of this application.

Terms used in an implementation part of this application are merely used to explain specific embodiments of this application, and are not intended to limit this application.

With development of automotive technologies such as ADAS, IVI, and OTA, a bandwidth requirement for an in-vehicle network is increasingly high, and Ethernet-based development of in-vehicle networks gradually becomes a trend. For example, bus types in a current in-vehicle network have a large quantity, a great length, a heavy weight, and high costs, and transmission of various control signals, sensor data, and data related to an in-vehicle infotainment system in a vehicle requires a transmission guarantee of different degrees of bounded latencies. Time-sensitive networking (TSN) is a group of standards that are studied by the institute of electrical and electronics engineers (IEEE) 802.1 time-sensitive networking task group. The standards mainly define a mechanism of time-sensitive transmission over an Ethernet, and are derived from an IEEE 802.1Q virtual local area network. Because an application scenario of the TSN is quite wide, and a bounded latency of transmission arouses particular attention, in an Ethernet-based process of the in-vehicle networks, the TSN has become an important technology in the Ethernet-based process of the in-vehicle networks.

In view of this, an embodiment of this application provides a packet forwarding method. In this method, based on a TSN technology, packets of a plurality of categories may be carried on an Ethernet link in an in-vehicle network, and packets are forwarded based on transmission requirements of the packets. The method may be applied to an in-vehicle control system, where the in-vehicle control system includes one or more centralized controllers, one or more domain controllers, one or more electronic control units (ECUs), and one or more Ethernet bridge devices; each centralized controller communicates with one or more of another centralized controller, the domain controller, and the ECU by using the Ethernet bridge device; each domain controller communicates with one or more of the ECU, another domain controller, and the centralized controller by using the Ethernet bridge device; at least one of the centralized controller, the domain controller, the ECU, and the Ethernet bridge device includes a packet forwarding apparatus, and the packet forwarding apparatus is configured to perform the packet forwarding method provided in the embodiments of this application. In addition, in an example embodiment, the centralized controller may further be directly connected to another centralized controller, the domain controller, and the ECU, and the domain controller may also directly communicate with the ECU, another domain controller, and the centralized controller. Quantities and communication manners of the centralized controllers, the domain controllers, the ECUs, and the Ethernet bridge devices in the in-vehicle control system are not limited in this embodiment of this application, and may be configured based on a scenario. In an example embodiment, one or more of the domain controller, the centralized controller, and the ECU have an Ethernet bridge function. In other words, an ECU, a domain controller, and a centralized controller that have an Ethernet bridge function may be used as an Ethernet bridge device. In an embodiment of this application, the Ethernet bridge device may be a centralized controller with an Ethernet bridge function, or the Ethernet bridge device is a domain controller with an Ethernet bridge function, or the Ethernet bridge device is an ECU with an Ethernet bridge function. In an example embodiment, one or more of the domain controller, the centralized controller, and the ECU have a gateway function. For example, the Ethernet bridge device includes an Ethernet switch.

A communication system in an in-vehicle network shown in FIG. 1 is used as an example. The communication system includes in-vehicle control devices such as an ECU, a centralized controller, a domain controller, and an Ethernet switch, as well as various input and output devices. The centralized controller and the domain controller are "brains" of all major systems on an automobile, and carry applications, which include but are not limited to ADAS, in-vehicle infotainment, and the like. The ECU is a control unit that widely and largely exists in a vehicle and that is configured to control one or more electronic systems. Various input and output devices include but are not limited to various sensors, cameras, radars, motor drives, signal output devices, and the like. In FIG. 1, a link shown by a thick line is an Ethernet link, and a link shown by a thin line is a non-Ethernet link. For example, the non-Ethernet link is a communication link based on a bus such as a controller area network (CAN), a local interconnect network (LIN), or a FlexRay.

In addition, as shown in FIG. 1, the ECU includes an ECU 111, an ECU 112, an ECU 113, an ECU 114, an ECU 115, and an ECU 116. In addition to an ECU function, the ECU 111 and the ECU 116 further have the gateway function. In addition to the ECU function, the ECU 115 further has the Ethernet bridge function. The domain controller includes a domain controller 121 and a domain controller 122. In addition to a domain controller function, the domain controller 121 further has the Ethernet bridge function. In addition to the domain controller function, the domain controller 122 further has the gateway function and the Ethernet bridge function. The centralized controller includes a centralized controller 131 and a centralized controller 132. In addition to a centralized controller function, the centralized controller 132 further has an Ethernet switch function. In a system shown in FIG. 1, all gateway functions have a protocol conversion function, and may implement conversion between an Ethernet (Ethernet, ETH) and another protocol, such as protocol conversion between ETH and CAN, protocol conversion between ETH and LIN, and protocol conversion between ETH and FlexRay.

In an in-vehicle network, various devices may be divided into a sending device (talker), a bridge forwarding device (bridge), and a receiving device (listener). For example, the system shown in FIG. 1 is used as an example. After devices in the system are divided into the talker, the bridge, and the listener, division results may be shown in the following Table 1:

TABLE 1

| Sending device (talker) | Bridge forwarding device (bridge) | Receiving device (listener) |
|---|---|---|
| a. Input and output devices, such as various sensors, millimeter wave radars, laser radars, ultrasonic radars, cameras, various actuators (various electronic drives and servo drives), players, and screens.<br>b. ECUs, such as various ECUs of control systems, ECUs of ADAS systems, ECUs of in-vehicle infotainment systems, and ECUs of OTAs.<br>c. Domain controller.<br>d. Central (centralized) controller. | e. In-vehicle switch or in-vehicle network bridge.<br>f. ECU, and domain controller/central (centralized) controller with a bridge function. | g. Input and output devices, such as various actuators (various electronic drives and servo drives), players, screens, various sensors, millimeter wave radars, laser radars, ultrasonic radars, and cameras.<br>h. ECUs, such as various ECUs of control systems, ECUs of ADAS systems, ECUs of in-vehicle infotainment systems, ECUs of OTAs.<br>i. Domain controller.<br>j. Central (centralized) controller. |

In addition to various devices listed in Table 1, a device of another category may further be included. For example, in Table 1, the talker labeled as c may be an edge computing device, a domain data center device, or the like, in addition to the domain controller. In Table 1, in addition to the central (centralized) controller, the talker labeled as d may further include a data center device. In Table 1, in addition to the ECU and the domain controller/a central (centralized) controller with the bridge function, the bridge labeled as f may further include an edge computing device, a domain data center device, a data center device, and the like. In Table 1, in addition to the domain controller, the listener labeled as i may further be an edge computing device, a domain data center device, and the like. In Table 1, in addition to a central (centralized) controller, the listener labeled as j may further include a data center device. This embodiment of this application sets no limitation on a specific device included in the talker, the bridge, and the listener. Regardless of what devices are included in the talker, the bridge, and the listener, a packet may be transmitted on Ethernet links among the talker, the bridge, and the listener, and the packet may be packets of a plurality of application categories.

Figure 2:
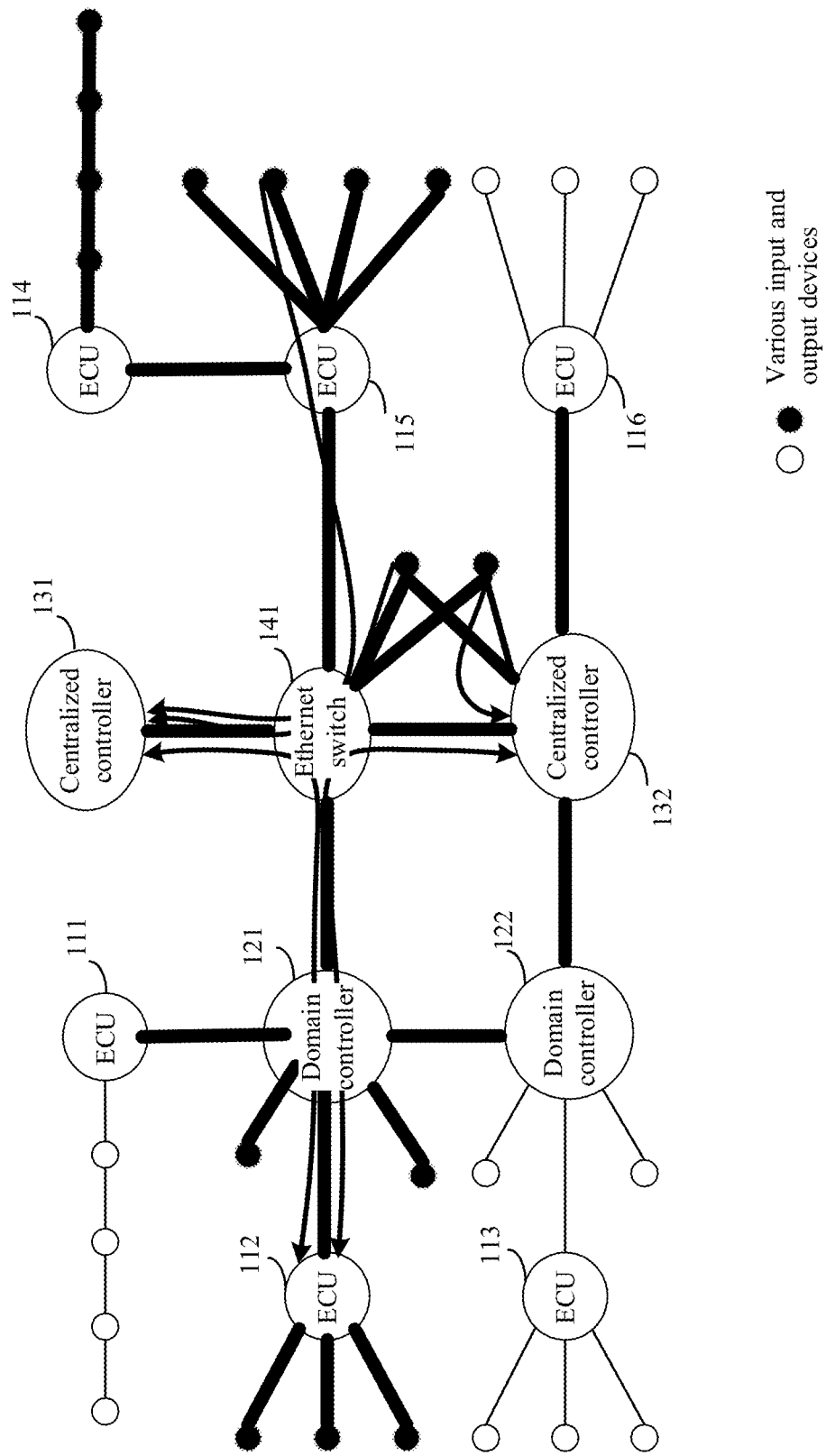
FIG. 2 is a schematic diagram of a communication system of an in-vehicle network according to an embodiment of this application.

For example, based on the foregoing system shown in FIG. 1 and the division results shown in Table 1, a transmission path of a packet is shown in FIG. 2. In FIG. 2, for example, a packet input by the input and output devices to the centralized controller 132 includes camera data. For the packet that includes the camera data, a packet that includes a control instruction for a camera may be output by using the centralized controller 132, the Ethernet switch 141, the domain controller 121, and the ECU 112. For example, a packet input by the input and output devices to the centralized controller 131 by using the Ethernet switch 141 includes laser radar data. A packet that includes a control instruction for a laser radar may be output by using the centralized controller 131, the Ethernet switch 141, the domain controller 121, and the ECU 112. For example, a packet input by the input and output devices to the centralized controller 131 by using the ECU 115 and the Ethernet switch 141 includes ultrasonic radar data. A packet that includes a control instruction for an ultrasonic radar may be output by using the centralized controller 131, the Ethernet switch 141, the domain controller 121, and the ECU 112. After receiving the packet, the Ethernet bridge device in the in-vehicle control system may forward the packet by using the packet forwarding method provided in this embodiment of this application.

Figure 3:
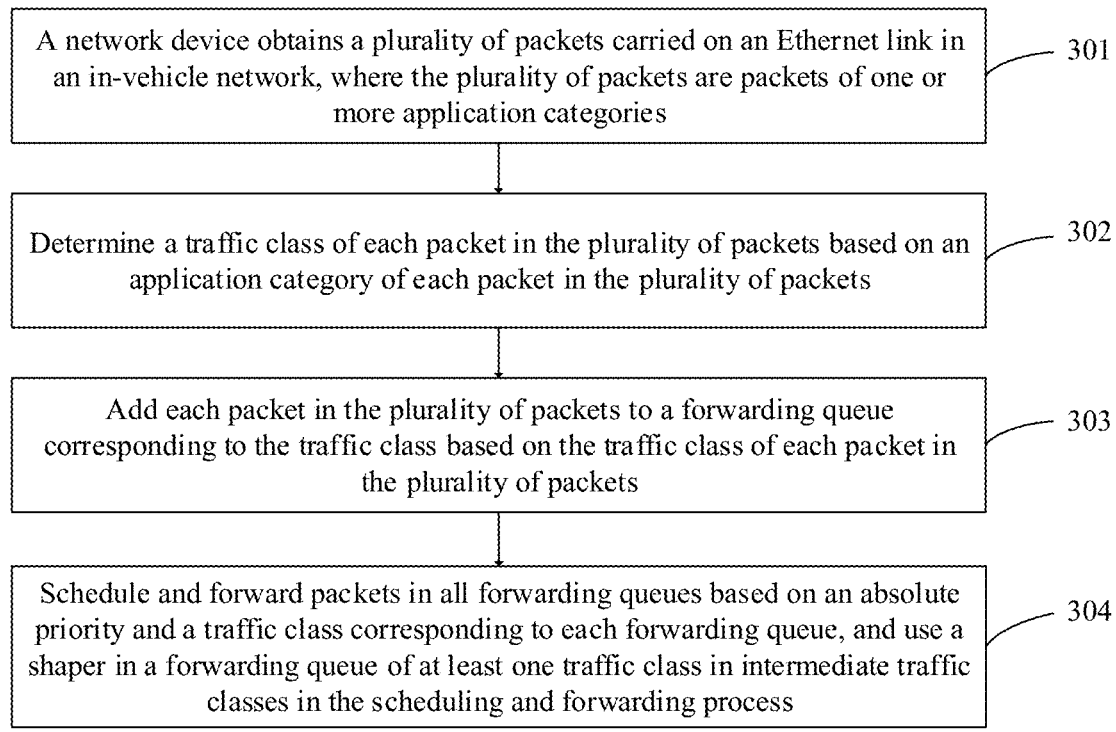
FIG. 3 is a flowchart of a packet forwarding method according to an embodiment of this application.

The method provided in this embodiment of this application provides a packet forwarding mechanism for flows with different kinds of packets in the in-vehicle network, that is, a scenario in which packets of various application categories are mixed on an Ethernet link for queuing and forwarding, so that the Ethernet link in the in-vehicle network may carry packets of various application categories, respective transmission requirements of these packets are met, and application of a new Ethernet-based in-vehicle network architecture is supported. Refer to FIG. 3. A packet forwarding method provided in this embodiment of this application includes the following several processes:

301. Obtain a plurality of packets carried on the Ethernet link in the in-vehicle network, where the plurality of packets are packets of one or more application categories.

For example, the plurality of packets carried on the Ethernet link may be packets related to an application that is currently being used on an in-vehicle system. For example, if an ADAS service and an in-vehicle infotainment service are currently being performed, the plurality of packets carried on an Ethernet link include a packet of an ADAS category and a packet of an in-vehicle infotainment category. This embodiment of this application sets no limitation on a quantity of the obtained plurality of packets carried on the Ethernet link in the in-vehicle network and corresponding application categories. For example, the plurality of packets carried on the Ethernet link may be the packets shown in FIG. 2. In the plurality of packets, the packet that includes the camera data, the packet that includes the laser radar data, and the packet that includes the ultrasonic radar data are all packets of an ADAS category; the packet that includes the control instruction for the camera, the packet that includes the control instruction for the laser radar, and the packet that includes the control instruction for the ultrasonic radar are packets of a control category.

302. Determine a traffic class of each packet in the plurality of packets based on an application category of each packet in the plurality of packets.

In an example embodiment, packet header information of each packet carries an application category of a service flow to which the packet belongs. Therefore, the application category of the service flow to which the packet belongs may be determined based on the packet header information, that is, the application category of the packet is obtained. For packets of various application categories carried on the Ethernet link, classification may be performed on various packets, that is, traffic classes of the packets of various application categories are determined. For example, in this embodiment of this application, different traffic classes may be obtained through division based on importance of application categories of packets. Higher importance indicates a higher traffic class. For packets of equal importance, finer traffic classes may be further obtained through division based on a traffic bandwidth. This embodiment of this application sets no limitation on a division manner of traffic classes, and no limitation on a quantity of the divided traffic classes, provided that packets of different categories meet respective transmission requirements when being forwarded.

For example, one or more application categories include one or more of a control category, an ADAS category, an in-vehicle infotainment category, and an OTA category; and a traffic class of a packet of the control category is the first class, a traffic class of a packet of the ADAS category is the second class, a traffic class of a packet of the in-vehicle infotainment category is the third class, a traffic class of a packet of the OTA category is the fourth class, where a priority of the first class is higher than that of the second class, a priority of the second class is higher than that of the third class, and a priority of the third class is higher than that of the fourth class.

For example, the packet of the control category includes at least one packet of a control instruction, sensor data, and alarm data; the packet of the ADAS category includes at least one packet of data of a detecting device and fusion data; the packet of the in-vehicle infotainment category includes at least one packet of map data, audio data, and video data; and the packet of the OTA category includes at least one packet of offline download data, firmware or software update data, and a log. The fusion data is data obtained after data of various categories is processed. For example, data obtained after particular processing is performed on data of a plurality of radar sensors and cameras is fusion data.

For example, in this embodiment of this application, the following traffic classes are obtained through division based on different traffic in the in-vehicle network:
  the first class, that is, a class A (light traffic is important): control-related traffic and traffic (a control instruction, an alarm, and the like) related to an ADAS system;
  the second class, that is, a class B (heavy traffic is important): traffic (various types of camera data, radar data, other sensor data, or the like) related to the ADAS system;
  the third class, that is, a class C (heavy traffic is less important): audio and video traffic related to in-vehicle infotainment; and
  the fourth class, that is, a class D (best effort, best effort): a log, OTA firmware/software update, and the like.

In an example embodiment, the method provided in this embodiment of this application further supports setting of a mapping between a packet related to the ADAS, the in-vehicle infotainment, the OTA, and the like in the in-vehicle network and the traffic class. For example, the determining a traffic class of each packet in the plurality of packets based on an application category of each packet in the plurality of packets includes: querying a mapping table between an application category and a traffic class based on the application category of each packet in the plurality of packets, to obtain the traffic class of each packet in the plurality of packets. The mapping table between the application category and the traffic class may be generated in advance. For example, a mapping between a packet and a traffic class is shown in Table 2 below. In addition to the mapping between a packet and a traffic class, Table 2 further includes a mapping between a talker and a listener. For example, the talker and the listener are represented by alphabetical codes in Table 1.

TABLE 2

| System | Packet | Sending device | Receiving device | Traffic class setting |
| --- | --- | --- | --- | --- |
| ADAS | Control instruction and alarm signal | b/c/d | g/h/i/j | Class A |
| | Data of millimeter wave radar, laser radar, ultrasonic radar, camera, and the like | a | h/i/j | Class B |
| | Mapping data | b/c/d | h/i/j | Class C |
| IVI | Audio | b/c/d | g | Class C |
| | Video | b/c/d | g | Class C |
| OTA | Offline download, firmware/software update, and log | a/b/c/d | g/h/i/j | Class D |

303. Add each packet in the plurality of packets to a forwarding queue corresponding to the traffic class based on the traffic class of each packet in the plurality of packets.

In the method provided in this embodiment of this application, scheduling and forwarding in a queue manner are supported for the plurality of packets carried on the Ethernet link. Therefore, in an example embodiment, each traffic class corresponds to one forwarding queue. After the traffic class of each packet in the plurality of packets is determined, each packet in the plurality of packets may be added to the forwarding queue corresponding to the traffic class.

Figure 4:
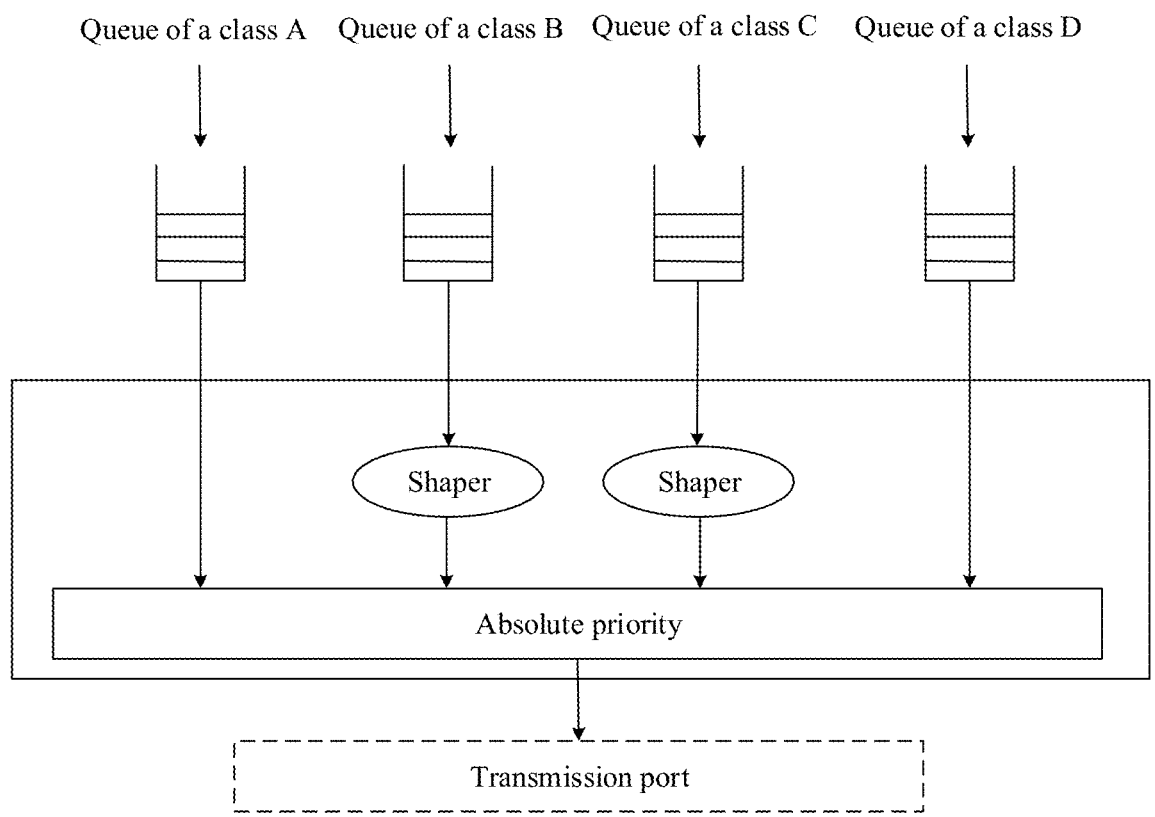
FIG. 4 is a schematic diagram of a forwarding queue according to an embodiment of this application.

For example, for a packet whose traffic class is the first class, the packet is added to a forwarding queue corresponding to the first class. For a packet whose traffic class is the second class, the packet is added to a forwarding queue corresponding to the second class. For a packet whose traffic class is the third class, the packet is added to a forwarding queue corresponding to the third class. For a packet whose traffic class is the fourth class, the packet is added to a forwarding queue corresponding to the fourth class. As shown in FIG. 4, for example, the first class is the class A, the second class is the class B, the third class is the class C, and the fourth class is the class D. A queue of the class A corresponds to a traffic class A, a queue of the class B corresponds to a traffic class B, a queue of the class C corresponds to a traffic class C, and a queue of the class D corresponds to a traffic class D.

304. Schedule and forward packets in all forwarding queues based on an absolute priority and a traffic class corresponding to each forwarding queue, and use a shaper in a forwarding queue of at least one traffic class in intermediate traffic classes in the scheduling and forwarding process.

The absolute priority is a mechanism for determining a transmission sequence based on the traffic class, and different traffic classes correspond to different priorities. The scheduling and forwarding packets in all forwarding queues based on an absolute priority means scheduling and forwarding packets in all forwarding queues based on a priority sequence corresponding to a traffic class, that is, forwarding queues of each traffic class are scheduled based on the priority sequence. For example, the method provided in this embodiment of this application includes four traffic classes: the first class, the second class, the third class, and the fourth class. A priority of the first class is higher than that of the second class, a priority of the second class is higher than that of the third class, and a priority of the third class is higher than that of the fourth class. Therefore, when packets in all forwarding queues are scheduled and forwarded based on the absolute priority, the packets in all forwarding queues are scheduled and forwarded successively based on a sequence of the first class, the second class, the third class, and the fourth class.

In an example embodiment, the scheduling and forwarding packets in all forwarding queues based on an absolute priority and a traffic class corresponding to each forwarding queue, and using a shaper in a forwarding queue of at least one traffic class in intermediate traffic classes in the scheduling and forwarding process includes: in a process of the scheduling and forwarding packets in all forwarding queues based on an absolute priority and a traffic class corresponding to each forwarding queue, for any packet in the plurality of packets, determining whether there is another packet that has a higher traffic class than the any packet and that has not been scheduled and forwarded; if there is no other packet that has a higher traffic class than the any packet and that has not been scheduled and forwarded, determining whether the shaper is used in the forwarding queue in which the any packet is located; or if the shaper is used in the forwarding queue in which the any packet is located, and the shaper meets a requirement, forwarding the any packet.

In an example embodiment, for any packet in the plurality of packets, if it is determined that there is another packet that has a higher traffic class than the any packet and that has not been scheduled and forwarded, the any packet is not scheduled and forwarded temporarily. For example, another packet that has a higher traffic class than the any packet is preferentially scheduled and forwarded.

In an example embodiment, for any packet in the plurality of packets, if it is determined that there is no other packet that has a higher traffic class than the any packet and that has not been scheduled and forwarded, and that the shaper is not used in the forwarding queue in which the any packet is located, the any packet is forwarded.

In an example embodiment, for any packet in the plurality of packets, if it is determined that there is no other packet that has a higher traffic class than the any packet and that has not been scheduled and forwarded, and that the shaper is used in the forwarding queue in which the any packet is located and the shaper does not meet the requirement, the any packet is not scheduled and forwarded temporarily.

Whether the shaper meets the requirement may be determined based on a type of the shaper. For example, for a credit-based shaping (credit-based shaping, CBS) shaper, that the shaper meets a requirement means that the packet can dequeue only when a credit (credit) value is non-negative and there is no frame of a higher priority to contend against.

By using a shaper in a forwarding queue of an intermediate traffic class, guarantee of different degrees of bounded latencies may be provided for transmission requirements of packets.

For example, the determined traffic classes include the first class, the second class, the third class, and the fourth class. The second class and the third class are intermediate traffic classes, and the shaper is additionally used in a forwarding queue corresponding to at least one of the second class or the third class. For example, the queue shown in FIG. 4 is still used as an example. The queue of the class B and the queue of the class C are used as intermediate traffic classes, and a shaper may be used. In addition, the queue of the class A, the queue of the class B, the queue of the class C, and the queue of the class D are scheduled based on an absolute priority sequence, and are forwarded from a transmission interface.

For example, the shaper includes at least one of a credit-based shaping shaper and an asynchronous traffic shaper.

That the credit-based shaping (CBS) shaper is additionally used in the forwarding queue of the intermediate traffic class is used as an example. For example, for the forwarding queue shown in FIG. 4, CBS shapers are used as shapers of the class B and the class C. The CBS shapers maintain their respective credits for each class, and the packet may dequeue until the credit is non-negative and there is no frame of a higher priority to contend against. Prior to use, a centralized network configuration (CNC) controller may be used for configuration. A specific priority carried by the packet is configured based on a flow classification. For example, a sum of bandwidth of flows of the class B and the class C on each egress port is separately calculated by using the following formula (1), and a corresponding idle slope (idleSlope) is configured for the egress port based on the sum of bandwidth. The idleSlope determines a rising rate of a credit.

$$\text{Bandwidthstream} = \text{MaxFramesPerinterval} * \text{MaxFrameSize} / \text{Interval} \qquad (1),$$

where Bandwidthstream represents a sum of packet bandwidth, MaxFramesPerinterval represents a maximum frame interval, MaxFrameSize represents a maximum frame size, and Interval represents an interval. Three parameters on the right side of the formula (1) are all in a standard user network interface (UNI). This is not limited in this embodiment of this application.

When the configuration of the CBS needs to be updated in the case of a change of a traffic requirement due to a user customization requirement and firmware upgrade, configuration parameters may be re-calculated and delivered by using the CNC. The CNC is a logical concept, and does not necessarily need to be an independent device. Its functional entity may be integrated into a centralized controller, a domain controller, or a switch on an automobile, or may be located in a cloud (the automobile downloads and enables the configuration update). A new configuration may take effect at the next start of the automobile. In addition, exchange between user requirement information and the CNC is performed by using the standard UCI defined in the IEEE 802.1Q.

Figure 5:
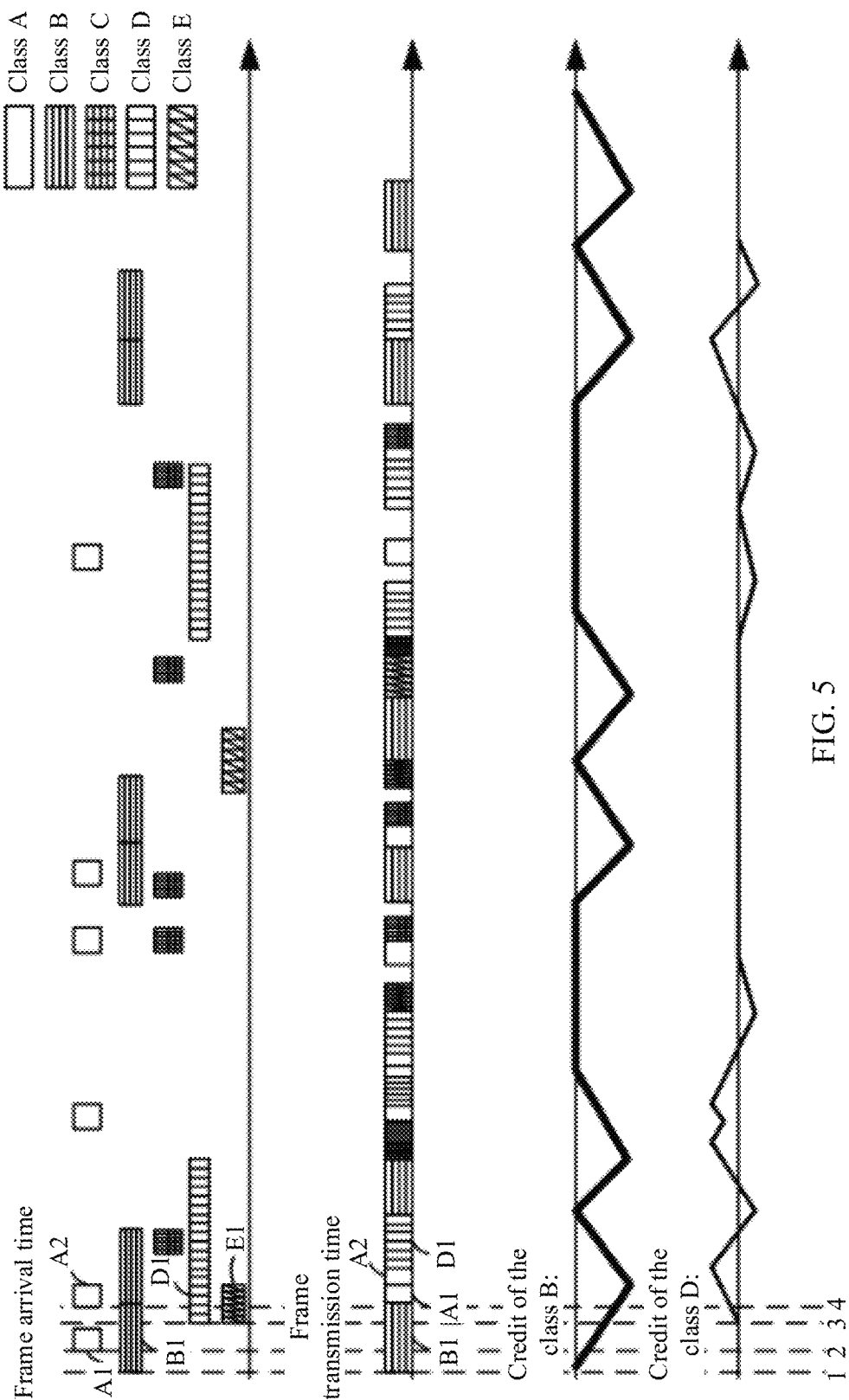
FIG. 5 is a schematic diagram of a packet forwarding process according to an embodiment of this application.

An example in which the CBS is used as an embodiment effect diagram of the shaper in this solution is shown in FIG. 5. When five priorities are set, classes A, B, C, D, and E are respectively provided in descending order of absolute priorities; the CBS shaper is additionally used for the class B and the class D to separately maintain the credit, and the packet may dequeue only when the credit is non-negative and there is no frame of a higher priority to contend against; the class A and the class B are used as express, and the class A may preempt a frame of another class except the class B; for a maintenance rule for the credit, refer to the definition in the IEEE 802.1Qav standard.

As shown in FIGS. 5, 1 to 4 represent different time points. For a credit of the class B, the credit of the class B is not less than 0 at the first time point. At the arrival time of a frame B1 of a first packet of the class B, no other packet is being transmitted, and no packet that has a higher priority than that of the class B is queuing up. Therefore, the frame B1 of the first packet of the class B can be transmitted. When the frame B1 of the first packet of the class B is being transmitted, at the second time point, a frame A1 of a first packet of the class A is received. Because a priority of the class A is higher than that of the class B, after the transmission of the frame B1 of the first packet of the class B that is being transmitted ends, the frame A1 of the first packet of the class A is transmitted. At the third time point, a frame D1 of a first packet of the class D and a frame E1 of a first packet of a class E are received, and then at the fourth time point, a frame A2 of a second packet of the class A is further received. Although the credit of the class D is not less than 0 between the third time point and the fourth time point, because the priority of the class A is higher than a priority of the class D and a priority of the class E, the frame A1 of the first packet of the class A and the frame A2 of the second packet of the class A are first transmitted. Transmission of the frame A2 of the second packet of the class A ends. A credit of the class B is less than 0, there is no packet to be transmitted in the class C, and a credit of the class D is not less than 0. Therefore, a frame D1 of a packet of the class D is transmitted. By analogy, transmission is performed for each queue based on absolute priorities of the class A>the class B>the class C>the class D>the class E, and a shaper is additionally considered for an intermediate class, so as to implement scheduling and forwarding of the plurality of packets carried on the Ethernet link.

In an example embodiment, in addition to selecting a CBS, an asynchronous traffic shaping (ATS) may alternatively be selected as a shaper of the class B and/or the class C. An eligibility time is calculated for each packet. This parameter determines a dequeuing sequence of packets that belong to different flows in a same class. To use the CNC, a specific priority carried in the packet is configured based on flow classification.

According to the formula (1) and the formula (2), a commitment information rate (CommittedInformationRate) (which determines the calculation of the eligibility time) is configured for each flow in the class B and/or the class C flow by flow.

$$\text{CommittedInformationRate} stream = \text{Bandwidth} stream \quad (2)$$

For example, when the configuration of the ATS needs to be updated in the case of a change of a traffic requirement due to a user customization requirement and firmware upgrade, the CNC re-calculates and delivers configuration parameters. The CNC is a logical concept, and does not necessarily need to be an independent device. Its functional entity may be integrated into a centralized controller, a domain controller, or a switch on an automobile, or may be located in a cloud (the automobile downloads and enables the configuration update). A new configuration may take effect at the next start of the automobile. Exchange between the user requirement information and the CNC is performed by using the standard User-Network Interface defined in IEEE 802.1Q.

By using the CBS shaper, transmitting audio and video streams is designed, smoothing processing is performed on the audio and video streams, and bounded latency guarantee for a packet that is being scheduled is provided. In the method provided in this embodiment of this application, the CBS shaper is used in an intermediate traffic class, without requiring that only the highest priority should use the CBS, so that an average latency of packets is reduced. Therefore, this scheduling and forwarding manner is more flexible. However, the CBS is not necessarily suitable for transmitting a critical control flow. The ATS may perform smoothing processing on different packets in a same packet class, but is not necessarily suitable for transmitting the critical control flow. Therefore, this embodiment of this application sets no limitation on which shaper is selected. For example, the configuration may be performed based on an application scenario.

According to the method provided in this embodiment of this application, for the packet of one or more application categories carried on the Ethernet link, the traffic class of each packet is determined based on the application category of each packet, and after each packet is added to the forwarding queue corresponding to the traffic class based on the traffic class of each packet, the packet in each forwarding queue is scheduled and forwarded based on the traffic class corresponding to each forwarding queue, thereby meeting a transmission requirement of each packet, so that the scheduling and forwarding have better performance. Therefore, the method is applicable to the Ethernet-based in-vehicle network architecture. In addition, by using the shaper in the forwarding queue corresponding to the intermediate traffic class, the bounded latency may be further ensured.

Figure 6:
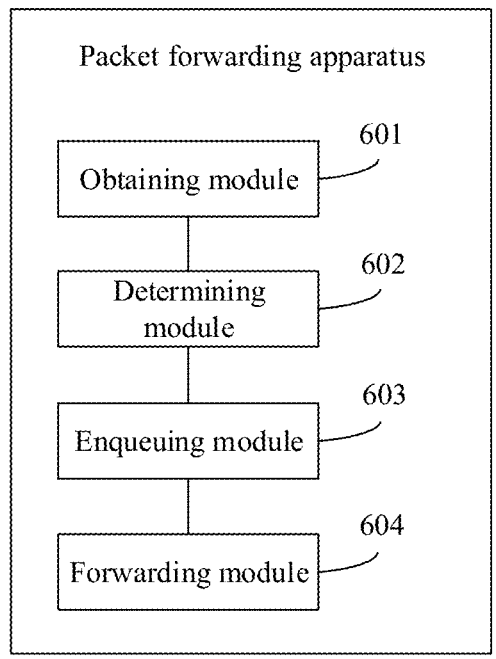
FIG. 6 is a schematic structural diagram of a packet forwarding apparatus according to an embodiment of this application.

An embodiment of this application provides a packet forwarding apparatus, where the apparatus is applied to a network device in an in-vehicle network. Refer to FIG. 6. The apparatus includes:

an obtaining module 601, configured to obtain a plurality of packets carried on an Ethernet link in the in-vehicle network, where the plurality of packets are packets of one or more application categories;

a determining module 602, configured to determine a traffic class of each packet in the plurality of packets based on an application category of each packet in the plurality of packets;

an enqueuing module 603, configured to add each packet in the plurality of packets to a forwarding queue corresponding to the traffic class based on the traffic class of each packet in the plurality of packets; and a forwarding module 604, configured to: schedule and forward packets in all forwarding queues based on an absolute priority and a traffic class corresponding to each forwarding queue, and use a shaper in a forwarding queue of at least one traffic class in intermediate traffic classes in the scheduling and forwarding process.

In an example embodiment, the forwarding module 604 is configured to: in a process of the scheduling and forwarding packets in all forwarding queues based on an absolute priority and a traffic class corresponding to each forwarding queue, for any packet in the plurality of packets, determine whether there is another packet that has a higher traffic class than the any packet and that has not been scheduled and forwarded; if there is no other packet that has a higher traffic class than the any packet and that has not been scheduled and forwarded, determine whether the shaper is used in the forwarding queue in which the any packet is located; or if the shaper is used in the forwarding queue in which the any packet is located, and the shaper meets a requirement, forward the any packet.

In an example embodiment, the determining module 602 is configured to: based on the application category of each packet in the plurality of packets, query a mapping table between an application category and a traffic class to obtain the traffic class of each packet in the plurality of packets.

In an example embodiment, the one or more application categories are a control category, an advanced driver-assistance system (ADAS) category, an in-vehicle infotainment category, and a remote download/upgrade/update (for example, over the air, OTA) category; and a traffic class of a packet of the control category is the first class, a traffic class of a packet of the ADAS category is the second class, a traffic class of a packet of the in-vehicle infotainment category is the third class, and a traffic class of a packet of the OTA category is the fourth class, where a priority of the first class is higher than that of the second class, a priority of the second class is higher than that of the third class, and a priority of the third class is higher than that of the fourth class.

In an example embodiment, the shaper is used in a forwarding queue corresponding to at least one of the second class or the third class.

In an example embodiment, the shaper includes at least one of a credit-based shaping shaper and an asynchronous traffic shaper.

In an example embodiment, the packet of the control category includes at least one packet of a control instruction, sensor data, and alarm data; the packet of the ADAS category includes at least one packet of data of a detecting device and fusion data; the packet of the in-vehicle infotainment category includes at least one packet of map data, audio data, and video data; and the packet of the OTA category includes at least one packet of offline download data, firmware or software update data, and a log.

According to the apparatus provided in this embodiment of this application, for the packet of one or more application categories carried on the Ethernet link, the traffic class of each packet is determined based on the application category of each packet, and after each packet is added to the forwarding queue corresponding to the traffic class based on the traffic class of each packet, the packet in each forwarding queue is scheduled and forwarded based on the traffic class corresponding to each forwarding queue, thereby meeting a transmission requirement of each packet, so that the scheduling and forwarding have better performance. Therefore, the apparatus is applicable to the Ethernet-based in-vehicle network architecture.

It should be understood that, when the apparatus provided in FIG. 6 implements functions of the apparatus, division into the foregoing functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatus in the foregoing embodiments and the method embodiments are based on a same concept. For a specific implementation process, refer to the method embodiments, and details are not described herein again.

Figure 7:
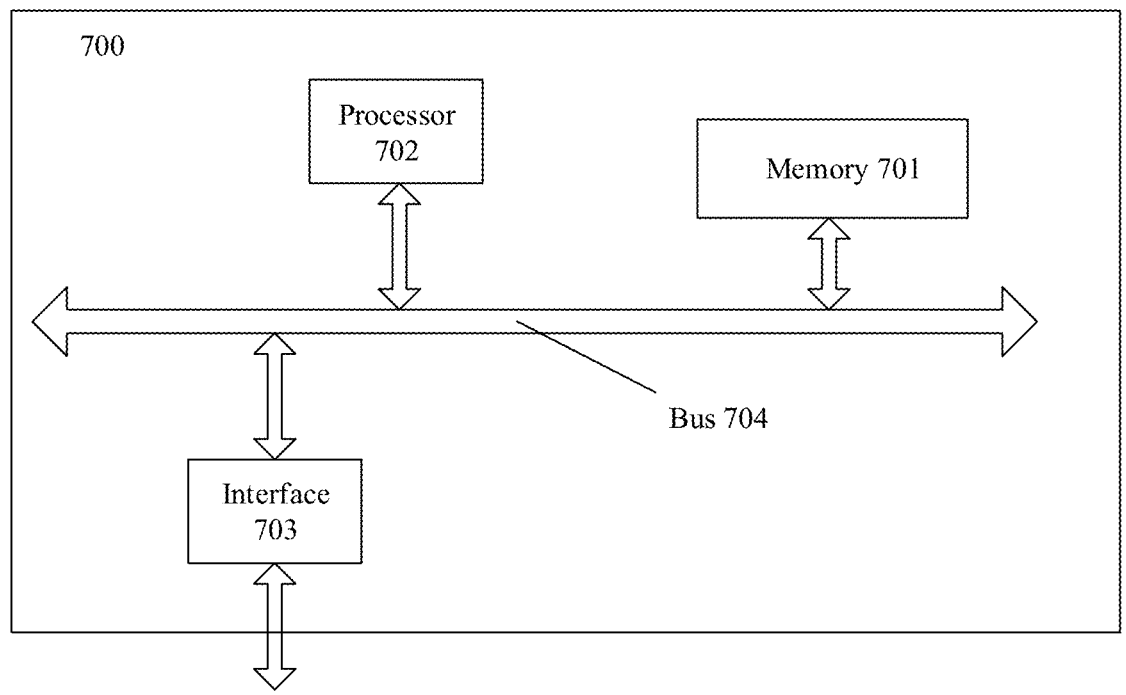
FIG. 7 is a schematic structural diagram of a packet forwarding device according to an embodiment of this application.

Refer to FIG. 7. An embodiment of this application further provides a packet forwarding device 700. The packet forwarding device 700 shown in FIG. 7 is configured to perform an operation related to the foregoing packet forwarding method. The packet forwarding device 700 includes a memory 701, a processor 702, and an interface 703. The memory 701, the processor 702, and the interface 703 are connected by using a bus 704.

The memory 701 stores at least one instruction, and the at least one instruction is loaded and executed by the processor 702, so as to implement any one of the foregoing packet forwarding methods.

The interface 703 is configured to communicate with another device in the network, and the interface 703 may be implemented in a wireless or wired manner. For example, the packet forwarding device 700 may communicate with a server by using the interface 703, so as to pull a packet.

It should be understood that FIG. 7 shows only a simplified design of the packet forwarding device 700. In actual application, the packet forwarding device may include any quantity of interfaces, processors, or memories. In addition, the processor may be a central processing unit (CPU), or may be another general-purpose processor, a digital signal processor (DSP), an application-specific integrated circuit (ASIC), a field-programmable gate array (FPGA), or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing machines (advanced RISC machines, ARM) architecture.

Further, in an optional embodiment, the foregoing memory may include a read-only memory and a random access memory, and provide instructions and data for the processor. The memory may further include a nonvolatile random access memory. For example, the memory may further store information about a device type.

The memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example instead of limitation, many forms of RAMs are available, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A computer-readable storage medium is further provided. The storage medium stores at least one instruction, and a processor loads and executes the at least one instruction to implement any one of the foregoing packet forwarding methods.

This application provides a computer program. When the computer program is executed by a computer, a processor or the computer may be enabled to perform corresponding operations and/or procedures in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely the embodiments of this application, but are not intended to limit this application. Any modification, equivalent replacement, or improvement made without departing from the spirit and principle of this application should fall within the protection scope of this application.

What is claimed is:

1. A packet forwarding method, wherein the method is applied to an in-vehicle network, and the method comprises:
    obtaining, by a network device, a plurality of packets carried on an Ethernet link in the in-vehicle network, wherein the plurality of packets are packets of one or more application categories;
    determining a traffic class of each packet in the plurality of packets based on an application category for each packet in the plurality of packets, wherein traffic classes comprise light traffic, heavy traffic, and best effort and for application categories having a same class, further determining the traffic class based on a traffic bandwidth;
    adding each packet in the plurality of packets to a forwarding queue corresponding to the traffic class based on the traffic class of each packet in the plurality of packets; and
    scheduling and forwarding packets in all forwarding queues based on an absolute priority and a traffic class corresponding to each forwarding queue, and using a shaper in a forwarding queue of at least one traffic class in intermediate traffic classes in the scheduling and forwarding process.

2. The method according to claim 1, wherein the scheduling and forwarding packets in all forwarding queues based on an absolute priority and a traffic class corresponding to each forwarding queue, and using a shaper in a forwarding queue of at least one traffic class in intermediate traffic classes in the scheduling and forwarding process comprises:
    in a process of the scheduling and forwarding packets in all forwarding queues based on an absolute priority and a traffic class corresponding to each forwarding queue, for any packet in the plurality of packets, determining whether there is another packet that has a higher traffic class than the any packet and that has not been scheduled and forwarded;
    performing one of:
    when there is no other packet that has a higher traffic class than the any packet and that has not been scheduled and forwarded, determining whether the shaper is used in the forwarding queue in which the any packet is located; or
    when the shaper is used in the forwarding queue in which the any packet is located, and the shaper meets a requirement, forwarding the any packet.

3. The method according to claim 1, wherein the determining a traffic class of each packet in the plurality of packets based on an application category of each packet in the plurality of packets comprises:
    querying a mapping table between an application category and a traffic class based on the application category of each packet in the plurality of packets, to obtain the traffic class of each packet in the plurality of packets.

4. The method according to claim 1, wherein the one or more application categories are one or more of a control category, an advanced driver-assistance system (ADAS) category, an in-vehicle infotainment category, and a remote download/upgrade/update category; and
    a traffic class of a packet of the control category is the first class, a traffic class of a packet of the ADAS category is the second class, a traffic class of a packet of the in-vehicle infotainment category is the third class, and a traffic class of a packet of the OTA category is the fourth class, wherein a priority of the first class is higher than that of the second class, a priority of the second class is higher than that of the third class, and a priority of the third class is higher than that of the fourth class.

5. The method according to claim 4, wherein the shaper is used in a forwarding queue corresponding to at least one of the second class or the third class.

6. The method according to claim 5, wherein the shaper comprises at least one of a credit-based shaping shaper and an asynchronous traffic shaper.

7. The method according to claim 4, wherein the packet of the control category comprises at least one packet of a control instruction, sensor data, and alarm data; the packet of the ADAS category comprises at least one packet of data of a detecting device and fusion data; the packet of the in-vehicle infotainment category comprises at least one packet of map data, audio data, and video data; and the packet of the OTA category comprises at least one packet of offline download data, firmware or software update data, and a log.

8. A packet forwarding apparatus, wherein the apparatus is applied to a network device in an in-vehicle network, and the apparatus comprises:
    a non-transitory memory storing instructions; and
    a processor coupled to the non-transitory memory; wherein the instructions, when executed by the processor, cause the packet forwarding apparatus to be configured to:
    obtain a plurality of packets carried on an Ethernet link in the in-vehicle network, wherein the plurality of packets are packets of one or more application categories;
    determine a traffic class of each packet in the plurality of packets based on an application category for each packet in the plurality of packets, wherein traffic classes comprise light traffic, heavy traffic, and best effort and for application categories having a same class, further determining the traffic class based on a traffic bandwidth;

add each packet in the plurality of packets to a forwarding queue corresponding to the traffic class based on the traffic class of each packet in the plurality of packets; and schedule and forward packets in all forwarding queues based on an absolute priority and a traffic class corresponding to each forwarding queue, and use a shaper in a forwarding queue of at least one traffic class in intermediate traffic classes in the scheduling and forwarding process.

9. The apparatus according to claim 8, wherein the instructions, when executed by the processor, further cause the packet forwarding apparatus to be configured to: in a process of the scheduling and forwarding packets in all forwarding queues based on an absolute priority and a traffic class corresponding to each forwarding queue, for any packet in the plurality of packets, determine whether there is another packet that has a higher traffic class than the any packet and that has not been scheduled and forwarded; performing one of when there is no other packet that has a higher traffic class than the any packet and that has not been scheduled and forwarded, determine whether the shaper is used in the forwarding queue in which the any packet is located; or when the shaper is used in the forwarding queue in which the any packet is located, and the shaper meets a requirement, forward the any packet.

10. The apparatus according to claim 8, wherein the instructions, when executed by the processor, further cause the packet forwarding apparatus to be configured to: based on the application category of each packet in the plurality of packets, query a mapping table between an application category and a traffic class to obtain the traffic class of each packet in the plurality of packets.

11. The apparatus according to claim 8, wherein the one or more application categories are a control category, an advanced driver-assistance system (ADAS) category, an in-vehicle infotainment category, and a remote download/upgrade/update category; and a traffic class of a packet of the control category is the first class, a traffic class of a packet of the ADAS category is the second class, a traffic class of a packet of the in-vehicle infotainment category is the third class, and a traffic class of a packet of the OTA category is the fourth class, wherein a priority of the first class is higher than that of the second class, a priority of the second class is higher than that of the third class, and a priority of the third class is higher than that of the fourth class.

12. The apparatus according to claim 11, wherein the shaper is used in a forwarding queue corresponding to at least one of the second class or the third class.

13. The apparatus according to claim 12, wherein the shaper comprises at least one of a credit-based shaping shaper and an asynchronous traffic shaper.

14. The apparatus according to claim 11, wherein the packet of the control category comprises at least one packet of a control instruction, sensor data, and alarm data; the packet of the ADAS category comprises at least one packet of data of a detecting device and fusion data; the packet of the in-vehicle infotainment category comprises at least one packet of map data, audio data, and video data; and the packet of the OTA category comprises at least one packet of offline download data, firmware or software update data, and a log.

15. An in-vehicle control system, wherein the in-vehicle control system comprises one or more centralized controllers, one or more domain controllers, one or more electronic control units (ECUs), and one or more Ethernet bridge devices;

each centralized controller communicates with one or more of another centralized controller, the domain controller, and the ECU by using the one or more Ethernet bridge devices;

each domain controller communicates with one or more of the ECU, another domain controller, and the centralized controller by using the one or more Ethernet bridge devices; and at least one of the centralized controller, the domain controller, the ECU, and the Ethernet bridge device comprises a packet forwarding apparatus, and the packet forwarding apparatus is configured to perform the packet forwarding method comprises:

obtaining, by a network device, a plurality of packets carried on an Ethernet link in the in-vehicle network, wherein the plurality of packets are packets of one or more application categories;

determining a traffic class of each packet in the plurality of packets based on an application category for each packet in the plurality of packets, wherein traffic classes comprise light traffic, heavy traffic, and best effort and for application categories having a same class, further determining the traffic class based on a traffic bandwidth;

adding each packet in the plurality of packets to a forwarding queue corresponding to the traffic class based on the traffic class of each packet in the plurality of packets; and scheduling and forwarding packets in all forwarding queues based on an absolute priority and a traffic class corresponding to each forwarding queue, and using a shaper in a forwarding queue of at least one traffic class in intermediate traffic classes in the scheduling and forwarding process.

16. The system according to claim 15, wherein one or more of the domain controller, the centralized controller, and the ECU have an Ethernet bridge function.

17. The system according to claim 15, wherein one or more of the domain controller, the centralized controller, and the ECU have a gateway function.

18. The system according to claim 15, wherein the Ethernet bridge device is a centralized controller with an Ethernet bridge function, or the Ethernet bridge device is a domain controller with an Ethernet bridge function, or the Ethernet bridge device is an ECU with an Ethernet bridge function.

* * * * *